United States Patent
Tsuda

(10) Patent No.: US 7,386,184 B2
(45) Date of Patent: Jun. 10, 2008

(54) ELECTRONIC CAMERA

(75) Inventor: Yutaka Tsuda, Yokohama (JP)

(73) Assignee: Nikon Corporation, Tokyo (JP)

( * ) Notice: Subject to any disclaimer, the term of this patent is extended or adjusted under 35 U.S.C. 154(b) by 408 days.

(21) Appl. No.: 11/262,757

(22) Filed: Nov. 1, 2005

(65) Prior Publication Data

US 2006/0109356 A1    May 25, 2006

(30) Foreign Application Priority Data

| Nov. 10, 2004 | (JP) | ............................. 2004-326620 |
| Oct. 25, 2005 | (JP) | ............................. 2005-310261 |

(51) Int. Cl.
*G06K 9/40* (2006.01)

(52) U.S. Cl. ....................... 382/260; 382/266; 382/274; 382/275; 358/3.26; 358/3.27; 358/463

(58) Field of Classification Search ................ 382/260, 382/266, 269, 274, 275; 358/3.26, 3.27, 358/463
See application file for complete search history.

(56) References Cited

U.S. PATENT DOCUMENTS

| 5,374,995 | A | | 12/1994 | Loveridge et al. |
| 5,748,800 | A | * | 5/1998 | Ueta et al. .................. 382/266 |
| 5,838,371 | A | | 11/1998 | Hirose et al. |
| 6,084,634 | A | | 7/2000 | Inagaki et al. |
| 6,773,663 | B2 | * | 8/2004 | Adams ........................ 420/433 |
| 6,874,420 | B2 | * | 4/2005 | Lewis et al. ................. 101/485 |
| 7,128,270 | B2 | * | 10/2006 | Silverbrook et al. ... 235/472.01 |
| 2001/0028397 | A1 | | 10/2001 | Nakamura |
| 2003/0098915 | A1 | | 5/2003 | Hyodo et al. |

FOREIGN PATENT DOCUMENTS

| EP | 1 569 442 A1 | 8/2005 |
| JP | 07-015653 | 1/1995 |
| JP | 09-135388 | 5/1997 |
| WO | WO 99/65235 A | 12/1999 |

* cited by examiner

*Primary Examiner*—Yosef Kassa
(74) *Attorney, Agent, or Firm*—Oliff & Berridge, PLC

(57) ABSTRACT

An electronic camera of the present invention includes an image pickup device, a positional data generating section, a memory, and an image processing section. The image pickup device includes a light-receiving plane photoelectrically converting a subject image. On the image pickup device any given partial image area is readable from a maximal image area. The positional data generating section generates positional data on the partial image area to the maximal image area. The memory holds a first edge enhancing filter used for data on the entire image and a second edge enhancing filter whose filter size is set smaller than that of the first edge enhancing filter. The image processing section performs, using the second edge enhancing filter, edge enhancement processing on data on a partial image extracted from the partial image area based on the positional data.

4 Claims, 4 Drawing Sheets

(a)

| F | E | D | E | F |
|---|---|---|---|---|
| E | C | B | C | E |
| D | B | A | B | D |
| E | C | B | C | E |
| F | E | D | E | F | edge=A*P33-B*(P23+P32+P34+P43)
 -C*(P22+P24+P42+P44)
 -D*(P13+P31+P35+P53)
 -E*(P12+P14+P21+P25+P41+P45+P51+P54)
 -F*(P11+P15+P51+P55)

(b)

| 0 | 0 | 0 | 0 | 0 |
|---|---|---|---|---|
| 0 | L | K | L | 0 |
| 0 | K | J | K | 0 |
| 0 | L | K | L | 0 |
| 0 | 0 | 0 | 0 | 0 | edge= J*P33-K*(P23+P32+P34+P43)
 -L*(P22+P24+P42+P44)

FIG.2

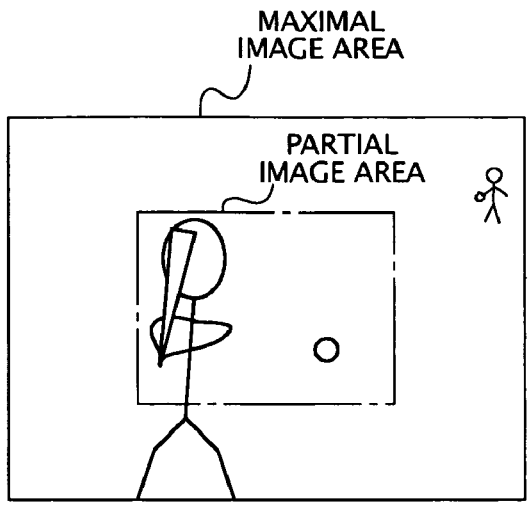
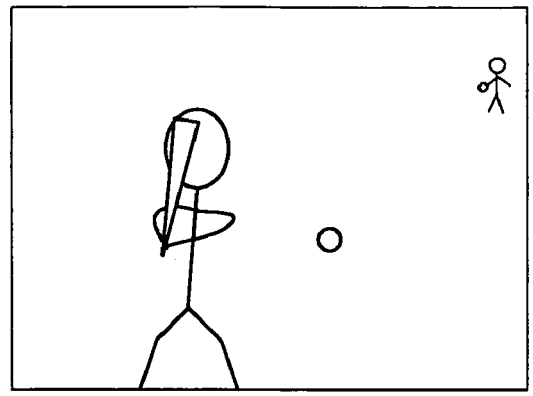
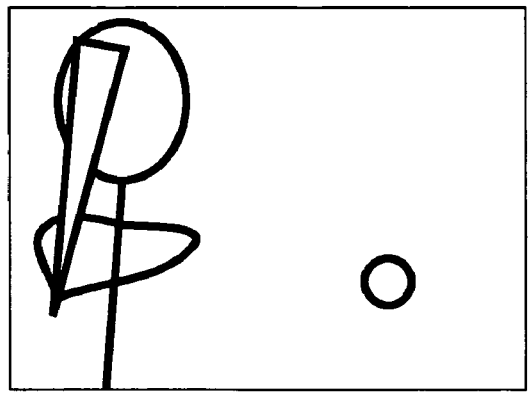
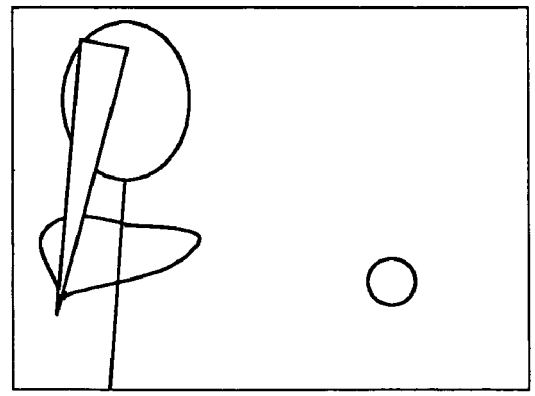

(a): SHOWS POSITIONS OF MAXIMAL IMAGE AREA AND PARTIAL IMAGE AREA OF IMAGE PICKUP DEVICE (b): SHOWS CASE WHERE ENTIRE IMAGE IS OUTPUTTED IN PREDETERMINED SIZE (c): SHOWS CASE WHERE PARTIAL IMAGE OBTAINED THROUGH FIRST EDGE ENHANCING FILTER IS OUTPUTTED IN SAME SIZE AS ABOVE (b)

(d): SHOWS CASE WHERE PARTIAL IMAGE OBTAINED THROUGH SECOND EDGE ENHANCING FILTER IS OUTPUTTED IN SAME SIZE AS ABOVE (b)

FIG.4

ELECTRONIC CAMERA

CROSS REFERENCE TO RELATED APPLICATION

This application is based upon and claims the benefit of priority from Japanese Patent Application No. 2004-326620, filed on Nov. 10, 2004, the entire contents of which are incorporated herein by reference.

BACKGROUND OF THE INVENTION

1. Field of the Invention

The present invention relates to edge enhancement processing of an electronic camera capable of partially reading out image signals from an image pickup device.

2. Description of the Related Art

There is a known electronic camera which partially reads out any given partial image area from a maximal image area of an image pickup device and performs a series of image processing such as edge enhancement on image signals thereof to generate photographic data on a partial image. For example, Japanese Unexamined Patent Application Publication No. Hei 9-135388 (Paragraph [0187] and FIG. 52) discloses a technique of removing fixed pattern noise caused by a dark current component in an electronic camera capable of partial readout from the image pickup device.

The edge enhancing filter of the electronic camera is set such that an edge of a photographed image is to be optimum at output display on a monitor or a printer. However, in the conventional electronic camera, the same edge enhancing filter is generally used for image data from partial readout (partial image) as well as for image data from all pixel readout, which causes the following problems.

The image data generated in the electronic camera is often enlarged so as to correspond to a predetermined size (for example, in printing, L size, 2L size, or the like) at monitor output and at printing. In such a case, the partial image is enlarged to a size larger than that of the entire image from the all pixel readout. Therefore, the edge width of an edge line of the partial image tends to be wider than that of the entire image.

Moreover, the edge enhancing filter is generally set so that the edge of the image is to be optimum when the entire image is outputted to the monitor or the printer, based on the premise that it is used for the image data on the entire image. When the partial image is outputted in the same size as that of the entire image, therefore, the entire image will be relatively visually desirable whereas the partial image will be visually undesirable due to a high degree of edge enhancement.

Also, the technique in Japanese Unexamined Patent Application Publication No. Hei 9-135388 is for storing in advance data of fixed pattern noise in an area wider than the partial image area in order to prevent a decrease in frame rate when the partial image area is changed, which only prevents re-obtainment of data. Accordingly, Japanese Unexamined Patent Application Publication No. Hei 9-135388 cannot resolve the above-described problems at all.

SUMMARY OF THE INVENTION

The present invention is made to solve the above-described problems in the related art. The object thereof is to provide an electronic camera capable of generating a partial image with an edge enhancement not very different from that of an entire image when the partial image is enlarged for output to the same size as that of the entire image.

An electronic camera of the present invention includes an image pickup device, a positional data generating section, a memory, and an image processing section. The image pickup device includes a light-receiving plane which photoelectrically converts a subject image. On the image pickup device any given partial image area is readable from a maximal image area which is used to generate an entire image of a maximum number of pixels on the light-receiving plane. The positional data generating section generates positional data on the partial image area with respect to the maximal image area. The memory holds a first edge enhancing filter used for data on the entire image and a second edge enhancing filter whose filter size is set to be smaller than that of the first edge enhancing filter. The image processing section performs, using the second edge enhancing filter, edge enhancement processing on data on a partial image which is extracted from the partial image area based on the positional data. When the partial image is enlarged and outputted in the same size as that of the entire image, a difference in edge widths of the partial image and the entire image is minimum.

Further, it is preferable that the image processing section of the electronic camera of the present invention select an edge enhancing filter to be used for the image data of the partial image area according to a size ratio between the maximal image area and the partial image area which is determined from the positional data.

Furthermore, it is particularly preferable that the electronic camera of the present invention include a filter specifying section. This filter specifying section specifies an edge enhancing filter to be used for the image data of the partial image area, according to an external input.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 2A and FIG. 2B show examples of parameters of a first edge enhancing filter and a second edge enhancing filter;

FIG. 4A to FIG. 4D are views to show the degrees of edge enhancement of an entire image and a partial image at the time of display.

DESCRIPTION OF THE PREFERRED EMBODIMENT (Description of Configuration of Electronic Camera)

Figure 1:
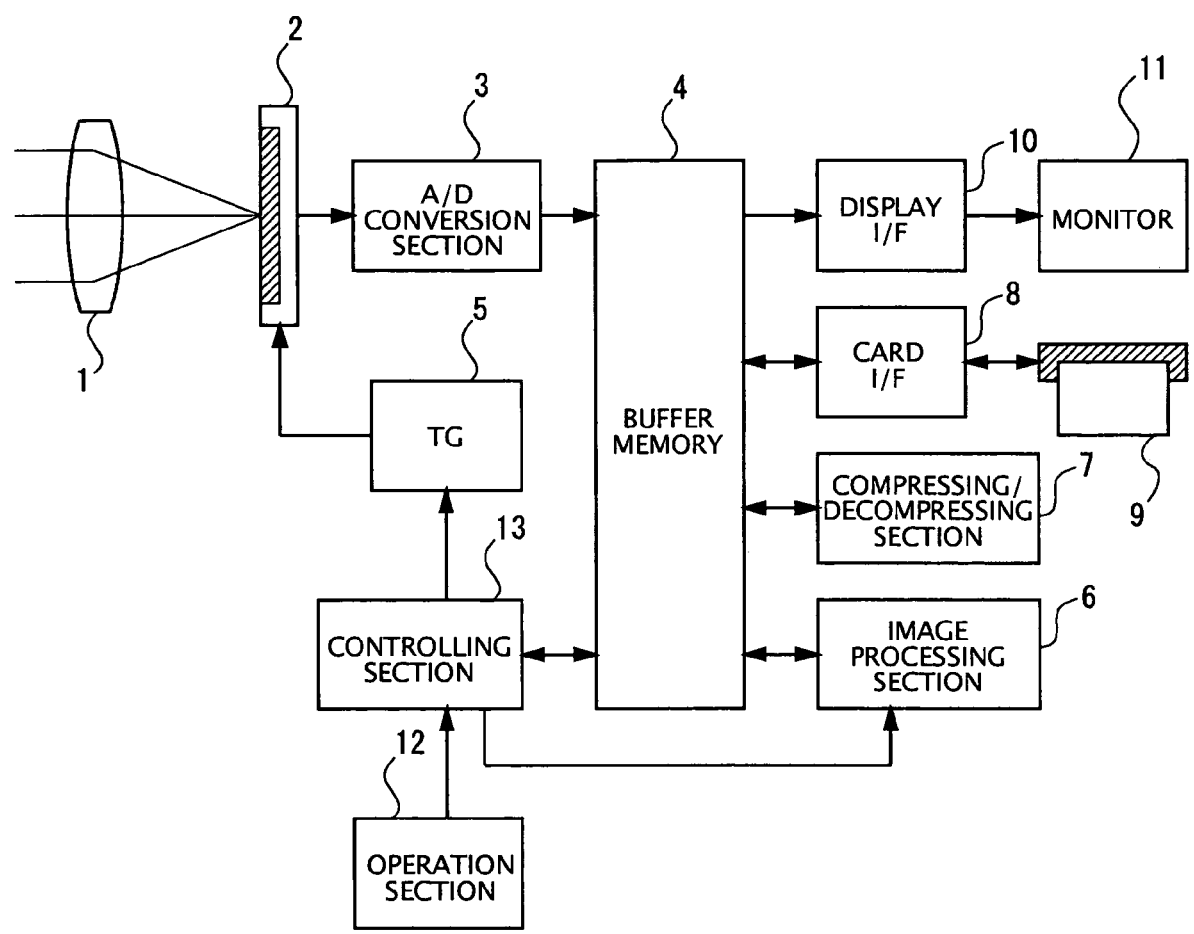
FIG. 1 is a functional block diagram of an electronic camera of an embodiment.

FIG. 1 is a functional block diagram of an electronic camera of the present embodiment. The electronic camera of the present embodiment includes a photographic lens 1, an image pickup device 2, an A/D conversion section 3, a buffer memory 4, a timing generator (TG) 5, an image processing section 6, a compressing/decompressing section 7, a card I/F 8, a storage media 9, a display I/F 10, a monitor 11, an operation section 12, and a controlling section 13.

The image pickup device 2 is placed on the image space of the photographic lens 1. Photodetectors which photoelectrically convert a subject image to generate analog image signals are two-dimensionally arranged on a light-receiving plane of the image pickup device 2 facing the photographic lens 1. The analog image signals outputted from the image pickup device 2 are converted into digital image data by the A/D conversion section 3.

The image pickup device 2 of the present embodiment is an XY address-type image pickup device (such as a CMOS) and can read an image signal of a photodetector designated by an address through random access. The image pickup device 2 of the present embodiment can select an all pixel readout mode or a partial readout mode. In the all pixel readout mode, all image signals are read from a maximal image area (a pixel area used for the electronic camera to generate an image with a maximum number of pixels) of the image pickup device 2. On the other hand, in the partial readout mode, image signals are read from any given partial image area out of the maximal image area of the image pickup device 2. Note that in the following description, the image of the maximum number of pixels generated in the all pixel readout mode will be referred to as an entire image. The image generated in the partial readout mode will be referred to as a partial image.

The buffer memory 4 is composed of an SDRAM or the like. This buffer memory 4 temporarily stores image data before or after image processing in the image processing section 6. In the buffer memory 4, data on a first edge enhancing filter and a second edge enhancing filter are stored. These data on the first edge enhancing filter and the second edge enhancing filter are used in edge enhancement processing in the image processing section 6.

FIG. 2A and FIG. 2B show examples of parameters of the first edge enhancing filter and the second edge enhancing filter. As shown in FIG. 2A, the first edge enhancing filter has a size of 5×5 pixels. This first edge enhancing filter is mainly used in the all pixel readout mode. On the other hand, as shown in FIG. 2B, the second edge enhancing filter has a size of 3×3 pixels, and its filter size is set smaller than that of the first edge enhancing filter. This second edge enhancing filter is used in the partial readout mode.

The edge enhancing filter enhances the edge of an image by increasing a brightness level change from surrounding pixels. On this occasion, the size of the edge enhancing filter and a filter reference area (range in which the output value of the image is changed) are proportional. Therefore, the larger the size of the edge enhancing filter, the wider the edge width after edge enhancement becomes.

The timing generator 5 generates driving signals necessary for operations of discharging unnecessary charges of photodetectors, storing charges, outputting stored charges, and so on at predetermined timing based on instructions of the controlling section 13 and supplies the respective driving signals to the image pickup device 2.

The image processing section 6 performs various kinds of image processing such as defect correction, gain correction, color interpolation, edge enhancement, gamma correction, and color matrix calculation on image data for one screen which is temporarily stored in the buffer memory 4. Here, the edge enhancement processing in the image processing section 6 is executed by the edge enhancing filter read from the buffer memory 4. The image processing section 6 makes a selection between the first edge enhancing filter and the second enhancing filter based on information from the controlling section 13.

The compressing/decompressing section 7 executes processing of compressing the image data after image processing in a JPEG format and processing of decompressing and reconstructing the image data compressed in the JPEG format. The storage media 9 is removably attached to the card I/F 8. For example, a card-type storage media with a built-in flash memory or the like corresponds to this storage media 9. The image data compressed by the compressing/decompressing section 7 is stored in the storage media 9.

The monitor 11 is connected to the display I/F 10. The monitor 11 displays thereon a screen to reproduce captured image data, a screen to perform various kinds of camera settings, and so on. The operation section 12 is composed of a command dial, a cross-shaped cursor key, and so on, and used for various kinds of selection inputs on the setting screen. On the setting screen of the electronic camera, (1) a mode selection between all pixel readout and partial readout, (2) specification of the size and position of the partial image, (3) manual specification of the edge enhancing filter, and so on can be performed.

The controlling section 13 controls the respective sections of the electronic camera by various kinds of calculation processing necessary for AE calculation and AF calculation, specification of the partial image area whose image signals are read out in the partial readout mode to the timing generator 5, and so on. Moreover, the controlling section 13 outputs either (a) specification information on the edge enhancing filter or (b) positional data on the partial image area to the image processing section 6.

(Description of Operation of Electronic Camera)

An image generating operation of the electronic camera of this embodiment will be described below.

When a photographer instructs shutter release, for example, by fully pressing a release button not shown, the controlling section 13 instructs the image pickup device 2 via the timing generator 5 to read out image signals. In the all pixel readout mode, the image pickup device 2 reads out all image signals of the maximal image area. In the partial readout mode, the image pickup device 2 reads out image signals from a preset partial image area by random access.

The image signals sequentially outputted from the image pickup device 2 are temporarily recorded in the buffer memory 4 after being digitalized by the A/D conversion section 3. Thereafter, when image data of the entire image or the partial image in the buffer memory 4 correspond to data for one screen, the image processing section 6 reads out the image data from the buffer memory 4 and executes various kinds of image processing.

Figure 3:
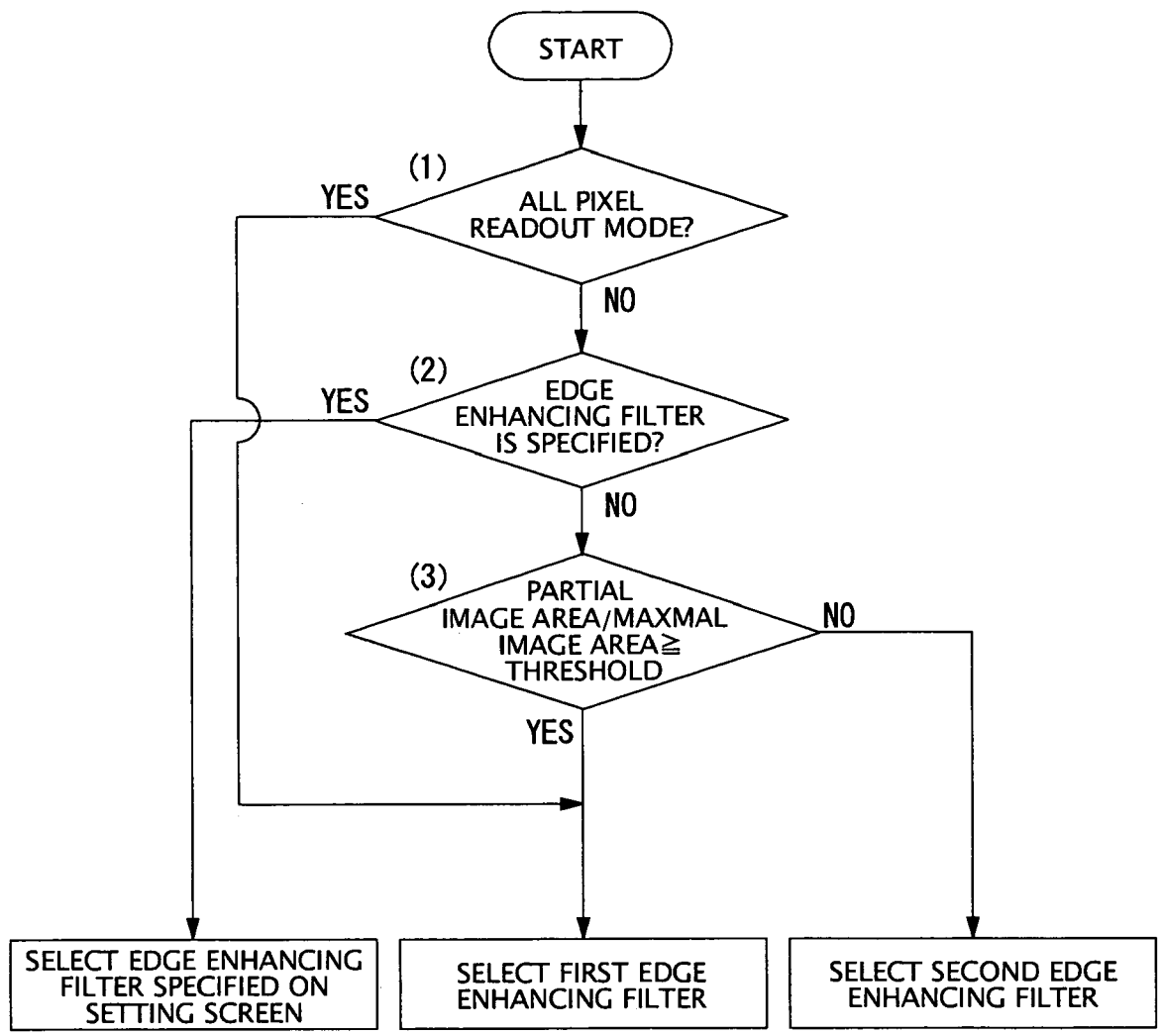
FIG. 3 is a flowchart regarding a selection between the edge enhancing filters.

In the edge enhancement processing of this embodiment, the edge enhancing filter is selected as described in (1) to (3) (See FIG. 3).

(1) In the all pixel readout mode, the controlling section 13 outputs specification information on the first edge enhancing filter to the image processing section 6. The image processing section 6 reads out the first edge enhancing filter from the buffer memory 4. The image processing section 6 then performs the edge enhancement processing on the image data on the entire image using the first edge enhancing filter.

(2) When the edge enhancing filter is specified by the photographer in the partial readout mode, the controlling section 13 outputs the specification information on the specified edge enhancing filter to the image processing section 6. The image processing section 6 reads out the specified edge enhancing filter from the buffer memory 4. The image processing section 6 then performs the edge enhancement processing on the image data of the partial image using the specified edge enhancing filter.

(3) When the edge enhancing filter is not specified in the partial readout mode, the controlling section 13 outputs the positional data on the partial image area. The image processing section 6 calculates the size ratio between the partial image area and the maximal image area (partial image area/maximal image area) based on the positional data on the partial image area. The value of the above-described ratio may be calculated either in a vertical direction of the screen or in a horizontal direction of the screen. If the above-described ratio value is equal to or more than a threshold, the image processing section 6 reads out the first edge enhancing filer from the buffer memory 4 and performs the filter enhancement processing on the image data on the partial image using the first edge enhancing filter. On the other hand, if the above-described ratio value is less than the threshold, the image processing section 6 reads out the second edge enhancing filter from the buffer memory 4 and performs the edge enhancement processing on the image data on the partial image using the second edge enhancing filter.

It is for the following reason that the edge enhancing filter is selected based on the size ratio between the partial image area and the maximal image area.

The image data on the entire image and the partial image generated by the electronic camera are often enlarged so as to correspond to a predetermined size (for example, in printing, L size, 2L size, or the like) in monitor output and in printing (See FIG. 4B to FIG. 4D). In such a case, the partial image is enlarged larger than the entire image. Namely, the edge width of an edge line of the partial image in this case tends to be wider than that of the entire image. On the other hand, the first edge enhancing filter is predicated on its use for the image data on the entire image. Namely, the first edge enhancing filter is set so that the edge of the image is optimum when the entire image is outputted to the monitor or the printer.

Therefore, with the case where the first edge enhancing filter is used for the image data on the entire image as a reference, the image processing section 6 of this embodiment uses the second edge enhancing filter having a smaller filter size for the image data on the partial image. Hence, an adjustment is made such that a difference in edge widths of the partial image and the entire image is to be minimum (See FIG. 4D). However, if the partial image and the entire image are not very different in size, the use of the first edge enhancing filter for the image data of the partial image may be preferable. In this case, the image processing section 6 changes the edge enhancing filter to be used according to the ratio between the entire image and the partial image.

Then, the image data after the image processing by the image processing section 6 is stored in the storage media 9 after being compressed in the JPEG format by the compressing/decompressing section 7. Thus, the successive image generating operation is completed.

According to the above-described electronic camera, in a case where the partial image is outputted in the same size as the entire image, it is possible to generate the partial image which is edge-enhanced at a degree not greatly different from the entire image and is therefore visually desirable. Further, when the partial image is not changed in size, the photographer can obtain the partial image as he intends to by specifying the edge enhancing filter.

(Supplementary Description of Embodiment)

For example, the filter sizes and parameters of the first edge enhancing filter and the second edge enhancing filter of the above-described embodiment can be appropriately changed.

Further, the image processing section may use the second edge enhancing filter for the image data on the partial image uniformly without calculating the ratio between the entire image and the partial image in the partial readout.

Furthermore, the electronic camera of the present invention is not limited to the camera with the XY address type image pickup device, and may be a camera with a progressive scanning type image pickup device such as a CCD. In the case of the camera with the progressive scanning type image pickup device, the same partial readout as in the above-described embodiment can be performed by temporarily reading only image signals on a horizontal line containing the partial image area and thereafter discarding unnecessary image signals on a vertical line.

The invention is not limited to the above embodiments and various modifications may be made without departing from the spirit and scope of the invention. Any improvement may be made in part or all of the components.

What is claimed is:

1. An electronic camera, comprising:
an image pickup device including a light-receiving plane which photoelectrically converts a subject image and on which any given partial image area are readable from a maximal image area, the maximal image area being used to generate an entire image of a maximum number of pixels on said light-receiving plane;
a positional data generating section which generates positional data on said partial image area with respect to said maximal image area;
a memory which holds a first edge enhancing filter used for data on said entire image and a second edge enhancing filter whose filter size is set to be smaller than that of said first edge enhancing filter; and
an image processing section which performs edge enhancement processing on data on a partial image using said second edge enhancing filter, the partial image being extracted from said partial image area based on said positional data, wherein
a difference in edge widths of said partial image and said entire image is minimum when said partial image is enlarged and outputted in a same size as that of said entire image.

2. The electronic camera according to claim 1, wherein said image processing section selects an edge enhancing filter to be used for image data of said partial image area, according to a size ratio between said maximal image area and said partial image area, the size ratio being determined from said positional data.

3. The electronic camera according to claim 1, further comprising
a filter specifying section which specifies, according to an external input, an edge enhancing filter to be used for the image data of said partial image area.

4. The electronic camera according to claim 2, further comprising
a filter specifying section which specifies, according to an external input, an edge enhancing filter to be used for the image data of said partial image area.

* * * * *